Patented Oct. 28, 1952

2,615,863

UNITED STATES PATENT OFFICE 2,615,863

POLYMERS

Paul J. Flory, Ithaca, N. Y., assignor to Wingfoot Corporation, Akron, Ohio, a corporation of Delaware No Drawing. Application September 29, 1950, Serial No. 187,681

12 Claims. (Cl. 260—78)

This invention relates to condensation polymers which are non-linear but which are capable of being drawn into fibers, molded or otherwise formed. More particularly, the invention relates to polyamides made by condensing amino acids, or derivatives thereof, with polyamines having more than two reactive amino groups.

Condensation polymers, both the polyesters and polyamides, have been known to the art for many years. More recently, the field has been systematically investigated and developed by W. H. Carothers, his co-workers, and others. Much of this work has been published in various patent specifications, and in "Collected Papers of W. H. Carothers," Interscience Publishers Inc., New York (1940). The prior art recognizes a critical distinction between two types of condensation polymers. When the compounds being condensed are bifunctional, that is, when each of the condensing molecules has only two reactive groups, the condensation must be linear. Thus, a monoamino-monocarboxylic acid, by itself, can only condense to form polymers of the general type:

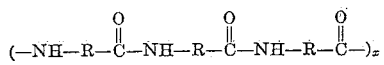

Similarly, diamines and dicarboxylic acids can only form linear polymers of the general type:

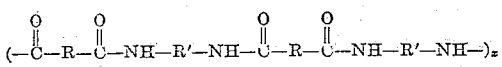

The symbols R and R' in the foregoing formulae may be any organic divalent radicals, preferably hydrocarbon radicals.

It has long been recognized that the introduction of polyfunctional units having three or more functions causes a network structure of the linear molecules and the resulting polymer will gel and lose its desirable thermoplastic properties. Such non-linear polymers are generally insoluble and infusible, apparently owing to the network structures which occur therein. The linear polymers, on the other hand, are thermoplastic because the long linear chains are not inter-connected by branched linkages. Similarly, it is well known that variation can be brought about by the incorporation of a polyfunctional reactant having more than two reactive groups with a mixture of other reactants which normally produce thermoplastic linear polymers. The replacement of a remarkably small percentage of one or the other of the bifunctional reactants by said polyfunctional reactant is known to cause the formation of thermoset, or gelled, products in place of the thermoplastic polymers which would otherwise be formed. For example, even one-half mole percent of a reactive tetrabasic acid when added to an equimolar mixture of decamethylene diamine and sebacic acid induces gelation during the polymerization. The product which otherwise would have been thermoplastic is thermoset and unsuitable for extrusion molding, solution casting and any other conventional plastic fabrication method. Usually such gelation takes place before a desirable molecular weight is achieved, and the compound so obtained is not capable of conventional usage.

Similarly, the use of other polyfunctional compounds having more than two reactive groups will form gelled thermoset polymers. The polymers formed similarly from triamino compounds, trihydroxy compounds and the other amino and hydroxy compounds having more than three functions are also non-thermoplastic and not capable of being used in any manner described by the art for linear polymer fabrication.

The prior art, as exemplified by Carothers' work, relates entirely to the linear type of condensation polymer. This is unequivocally stated in United States Patents 2,071,250 and 2,071,251 issued to Carothers. These patents further teach that only bifunctional compounds can be used to prepare linear polymers and that the use of polyfunctional compounds having more than two reactive groups will produce undesirable polymers.

Despite this teaching, it has now been found possible to synthesize new non-linear polymers which are thermoplastic and capable of being formed into strong useful fibers. A further purpose of this invention is to provide a method of preparing thermoplastic macromolecular polymers wherein, by proper selection and proportioning of reagents, the formation of gelled or non-thermoplastic polymers is avoided. Still further purposes of the invention are to provide simple and convenient methods of preparing new and valuable condensation polymers.

In accordance with this invention it has been found that polyamides of non-linear character may be prepared which are useful in the preparation of fibers and in various molding and forming operations, contrary to the expectations and teachings of the prior art. The new polyamides are prepared from polybasic amines having more than two reactive amino groups, or equivalent amide-forming amides thereof by condensation with amino acids having only one amino group and one carboxylic group, or equivalent derivatives of such amino acids such as esters, amides or lactams. While the new polymers are non-linear because of the use of reagents of functionality greater than two, they nevertheless do not possess a network structure. The new polymers may be represented by the formula:

wherein R' is the radical, or nucleus, of the polyamine having more than two reactive amino groups and to which the amino radicals are attached, R is the radical or nucleus of the amino acid, $x$ represents the average number of amino acid groups in the condensed chains, and $y$ represents the number of chains per R' nucleus.

The new amide condensation polymers may be regarded as multi-chain polymers in which long polyamide polymer chains extend from a nucleus containing at least three amino groups. For example, tetra (aminomethyl) methane will condense with an amino acid of the type

to form polymers which may be represented by structural formula as follows:

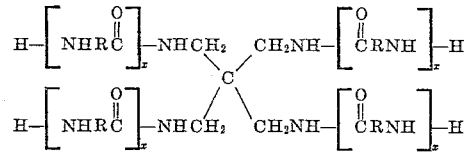

wherein $x$ is the average number of amino acid molecules condensed in the side chains.

The new condensation polymers are macromolecular multi-chain structures in which the number of amino groups in the nucleus (and the number of linear side chains) is three or more. The average number of amino acid molecules condensed in the side chains can vary over a wide range, for example, between 10 and 1000 and will preferably be between 25 and 200. The polyamine which forms the nucleus of the polymer may be any polyamine having three or more reactive amino groups (i. e. amino radicals containing at least one hydrogen atom attached to the nitrogen atom) attached to aliphatic carbon atoms.

Other polyamines having three or more reactive amino groups are 1,2,3-triamino propane, 1,2,4-triamino butane, diethylene triamine, triethylene tetramine, tetraethylene pentamine (and other polyalkylene polyamines), 1,1,1-trisaminomethylethane, 2,2,6,6-tetra (γ-aminopropyl) cyclohexanone, 1,1,1,2,2,2-hexakis aminomethylethane and 1,3,5-tri (β-aminoethyl) benzene. Other polyamines can be prepared by cyanoethylation [see chapter 2 by H. A. Bruson in Organic Reactions, vol. V, published by John Wiley and Sons, New York (1949)] followed by reduction of the cyano groups. In addition to simple, monomeric compounds, one can also use polymeric polyamines such as polyvinyl amine. Such polymeric amines are mixtures of amines varying in number of amino groups by reason of the variation in degree of polymerization. The polymers are defined in terms of average molecular weight or average number of amino groups per molecule. They can be polymerized to varying degrees, as desired. Accordingly, by the proper selection of the polyamine a multi-chain polyamide having any desired number of side chains can be formed.

In the preparation of the multi-chain polyamides the polyamines are condensed with monoamino-monocarboxylic acids or mixtures thereof, or equivalent amide-forming derivatives thereof such as esters, amides or lactams. Suitable compounds are 6-aminocaproic acid, 10-aminodecanoic acid, 9-aminostearic acid, 12-aminostearic acid, 13-aminobehenic acid, 9-aminomargaric acid, 14-aminobehenic acid, 9-aminopalmitic acid, 13-aminostearic acid, 2-methyl-epsilon-caprolactam, p(2-aminoethyl) benzoic acid and other known monocarboxylic acids and derivatives having a single amino function and more than four atoms between the amino and carboxyl groups.

Any amino acid which condenses predominantly intermolecularly, rather than intramolecularly, may be used. In general, amino acids having more than four carbon or other atoms separating the NH₂ and COOH groups undergo intermolecular condensation in preference to cyclization.

It will be noticed that the number of chains per molecule and the number of amino-acid groups per chain may be varied from relatively small numbers to very large values. Generally, where the number of chains present is relatively small, the chains are preferably of greater length, and where the chain length is quite short the preferred compounds will have a relatively large number of the side chains. Similarly, useful polyamides may be prepared with a moderate number of chains of intermediate length. Short chain polyamides and those having few chains may be too low in molecular weight to be useful in drawing fibers, but such polyamides may be useful as coating compositions or adhesives or in the preparation of molded objects. The higher molecular weight compositions are frequently crystalline in nature and can be drawn into strong elastic fibers. They are also useful in the preparation of coating compositions and in the molded products field. In general, the polyamides condensed from a single amino acid, or derivative thereof, are more useful in the preparation of fiber-forming polymers capable of being cold drawn, while the polymers of a plurality of different amino acids, or derivatives thereof, are particularly valuable as coating compositions and in the fabrication of molded products.

Although the number of side chains is determined by the selection of the polyamine the number of aminoacid nuclei in each chain will be determined by the relative number of polyamine and aminoacid molecules condensed. There will be generally between 30 and 30,000 molecules of aminoacid for each molecule of polyamine and in the preferred preparations these ratios are between 75 and 20,000.

The new multi-chain polyamides generally are prepared by heating the amino acid, or suitable derivative thereof, with the polyamine at temperatures above the melting point of the mixture. In some cases where a diluent is used, the temperature may be below the melting point of the reactants and of the polyamide, but above the melting point of the reaction mass including the diluent. Temperatures between 150° C. and 275° C. are usually required to produce a desirable polymer. In the preparation of multi-chain condensation polymers it is customary to carry the condnesation reaction as nearly to completion as is practical. In many cases it is desirable to employ a lower temperature initially, such that the reaction proceeds at a moderate rate, the temperature being raised at a later stage to facilitate substantial completion of the condensation. In some instances, the temperature may be gradually increased throughout the reaction, or increased intermittently so as to operate at three or more different temperatures. The condensation reaction usually is completed at temperatures in the vicinity at 250° C. In some cases, as for example where the melting point is unusually high, it may be necessary to operate at higher temperatures in order to maintain the polymerizing mixture in molten condition. If the melting temperature approaches the decomposition temperature, usually in the vicinity of 300° C., it often is desirable to reduce the melting point by employing an inert diluent such as a high boiling phenolic compound.

At the high temperatures employed, for example over 200° C., the polymerizing mixture is susceptible to oxidation by air, or even traces of oxygen. Oxidation causes darkening and degradation of the polymer. Accordingly, it is important to exclude oxygen from the reaction vessel. This is accomplished by sweeping out the vessel with nitrogen or other inert gas, prior to the initiation of the reaction, and maintaining the oxygen-free atmosphere by passing a continuous stream of the inert gas through the reaction chamber during the polymerization. The stream of inert gas further assists in removing traces of water vapor, alcohols, or other by-products formed by the reaction, depending upon the particular derivatives selected for the preparation. Although any inert gas, such as helium and argon, may be used, nitrogen is preferred for reasons of economy. Ordinary commercial nitrogen, however, is not useful because it contains traces of oxygen which interfere with normal operation. Accordingly, it is necessary to purify the nitrogen by the removal of all traces of oxygen.

The progress of the polymerization can be conveniently followed by periodically determining the viscosity of the molten mass in situ, and at the temperature of polymerization. As already mentioned, it is desirable in the preparation of multi-chain polymers to carry the reaction very nearly to completion. Accordingly, further heating is discontinued when the condensation has reached substantial completion as judged by the tendency of the melt viscosity to approach an asymptotic upper limit, that is, when successive viscosity measurements, separated by an interval of 15 minutes to an hour, show no large increase in viscosity.

Usually, but depending somewhat on the nature of the particular reactants, it is preferred to subject the hot reaction mixture to reduced pressure during at least a portion, usually the later stages, of the polymerization. In this manner low molecular weight volatile by-products of the condensation as well as unreacted monomers, such as the lactams, may be largely removed. Pressures between 10 and 100 mm. of mercury are preferred for this purpose. A stream of inert gas, such as oxygen-free nitrogen, may be passed through the reaction mass while it is under reduced pressure to facilitate removal of volatile materials. The completed polymers may be drawn into filaments immediately or they may be cooled and ground to convenient size for storage. The molten polymer may be cooled by quenching in water and the resultant product ground to desired size and dried.

The specific polymerization procedure employed will be governed largely by the particular reactants in a given case. A few further generalizations may be mentioned. If an amino acid or its ester or amide is to be polymerized with the polyamine, the reactants may be heated together at atmospheric pressure, in the absence of oxygen, under conditions permitting removal of the by-product water, alcohol, or ammonia. If, on the other hand, a lactam of the amino acid is to be employed, it may be necessary to subject the reactants to a preliminary heating above their melting points, and usually in the neighborhood of 180 to 225° C., in a closed system. In such cases it is customary to add a small proportion of water to the ingredients for the purpose of assuring intermolecular reaction of the lactam. After the preliminary heating period, usually for 2 to 4 hours, the polymerization is completed at atmospheric or lower pressures as described above. Alternatively, the pressure developed by the water may be released gradually by bleeding off the water slowly.

In the preparation of high molecular weight polyamides it is frequently desirable to reduce the viscosity of the polymers during the condensation reaction by adding plasticizers. These plasticizers are high-boiling compounds which are liquids at the condensation temperatures and solvents for the polyamides. Such compounds reduce the viscosity of the polymers and permit the use of higher temperatures than would otherwise be possible. Accordingly, by adding the plasticizers, higher molecular weights are reached and polyamides useful in fiber drawing are prepared, which otherwise would not be capable of such use. Suitable plasticizers are p-hydroxydiphenyl, xylenol, and o-hydroxydiphenyl.

The new multi-chain polymers may be drawn into filaments by extruding the molten polymer through dies or orifices of suitable size, whereby continuous fibers are produced by the congealing of the polymers. Similar filaments may be prepared by the preparation of solutions of the polymer in any suitable solvent, such as an alcohol, a phenol, a glycol, a chlorhydrin, formic acid or sulfuric acid, and extruding the solution through a die into a heated drying atmosphere or into a liquid which is miscible with the solvent but is a non-solvent for the polymer. The latter wet processes for spinning produce filaments similar to the melt extrusion methods. By variation in the size and shape of the orifices, rods, sheets and other shaped polymers can be prepared. The polymers may be molded and otherwise shaped under heat and/or pressure. For example, the polymer may be rolled into thin sheets useful as wrapping material. Irregular shapes may be cast or pressed in suitable molds.

A principal property of the new polymers is their capacity for improved tensile strength achieved by cold drawing. If the fibers are elongated 100 to 500 percent at temperatures below their melting points, substantial improvement in tensile strength will be effected. Thin sheets may similarly be strengthened. The cold drawn fibers may be spun into thread or yarn of exceptional strength and woven into useful fabrics. Larger fibers may be used in the fabrication of brushes.

It should be understood that the new polyamides can be varied extensively in molecular structure, both by the selection of a polyamino compound having a desired number of amine groups and by the proportioning of the amino-acid with respect to the polyamine. By this means, the average length of the chains is controlled.

Further details of the preparation of the new polyamides are set forth with respect to the following specific examples.

*Example 1*

A mixture of 10.0 parts by weight (0.089 mol) of epsilon caprolactam and 6.618 parts by weight of an aqueous solution of tetra (aminomethyl) methane containing 4.53% polyamine by weight (0.0023 mol) was placed in a glass reaction vessel. All air was flushed out of the vessel by alternately evacuating it to a pressure of 20–30 mm. of mercury and filling it with pure nitrogen. After filling with nitrogen for the third time, the vessel was sealed. The reaction vessel and contents were then heated for four hours at 210–220° C. in order to open the lactam ring and form a low molecular weight polymer. The sealed glass container was then opened and vented through a cold condenser to a vacuum pump. A tube type viscometer was introduced into the reaction vessel, firstly, to serve as a conduit for passing nitrogen through the molten polymer to stir the mixture and to sweep out reaction by-products and unreacted epsilon caprolactam and, secondly, to measure the melt viscosity of the molten polymer at the completion of the reaction. The reaction vessel was then heated at 109° C. until the low polymer had melted and then at 118° C. until most of the water had been boiled off, as evidenced by solidification of the polymer. Heating was continued, with nitrogen stirring, at 229° C. for one hour, then at 241° C. and atmospheric pressure for one hour, and then at 241° C. and one mm. pressure for six and a quarter hours. The resultant polymer was of low viscosity, and low molecular weight. When cold, it was a yellow, brittle solid.

*Example 2*

A mixture of 10.0 parts by weight (0.089 mol) of epsilon caprolactam and 1.023 parts by weight of an aqueous solution of tetra (aminomethyl) methane containing 4.89% polyamine by weight (0.00038 mol) was placed in a glass reaction vessel. All air was flushed out of the vessel by alternately evacuating it to a pressure of 20–30 mm. of mercury and filling it with pure nitrogen. After filling with nitrogen the third time, the vessel was sealed. The reaction vessel and contents were then heated for four hours at 230° C. in order to open the lactam ring and form a low molecular weight polymer. The sealed glass container was then opened and vented through a cold condenser to a vacuum pump. A tube type viscometer was introduced into the reaction vessel, firstly, to serve as a conduit for passing nitrogen through the molten polymer to stir the mixture and to sweep out reaction by-products and unreacted epsilon caprolactam and, secondly, to measure the melt viscosity of the molten polymer at the completion of the reaction. The reaction vessel was then heated at 229° C. for one hour, during which time the polymer melted. After this occurred, nitrogen was admitted below the surface of the molten polymer through the viscometer tube. Heating was continued at 241° C. and atmospheric pressure for one hour, then at 241° C. and 20 mm. pressure for one hour, and finally at 255° C. and 20 mm. pressure for one hour. The final polymer had a melt viscosity of 600 poises at 255° C. and was a clear colorless viscous liquid at that temperature. Filaments formed from the molten polymer could be cold drawn to yield strong fibers. On cooling, 9.2 grams of a tough white solid polymer was obtained.

*Example 3*

A mixture of 10.0 parts by weight of epsilon caprolactam (0.089 mol), 0.215 part by weight of the tetrabenzamide of tetra (aminomethyl) methane, and 1.0 parts by weight of water was reacted in a glass reaction vessel according to the procedure described in Example 2. The resultant polymer had a melt viscosity of 2050 poises at 255° C. and was a clear amber liquid at that temperature. It formed filaments which could be easily cold drawn to form fibers of good strength. Upon cooling, 9.4 grams of a tough, white solid polymer was obtained.

In the preceding examples the melt viscosities were determined by the method described in Journal of the American Chemical Society, vol. 62, p. 1057 (1940).

The multi-chain polymers herein described are polyamides prepared by the inter-reaction of polyamines containing three or more reactive amino groups with aminoacids or the corresponding esters, amides and lactams. Other types of multi-chain polymers may be prepared by the use of other reagents.

For example, copending applications Serial Numbers 674,655 and 674,656, filed June 5, 1946, now U. S. Patents 2,524,045 and 2,524,046, of which the present application is a continuation-in-part, describes and claims multichain polymers from the reaction of polycarboxylic acids and aminocarboxylic acids.

Another type of multi-chain polymer may be prepared from polycarboxylic acids having more than two carboxylic acid radicals, or the derivatives of these polyacids, by inter-reaction with hydroxy acids, or the corresponding esters, and lactones.

Still other multi-chain polyamides may be prepared by reacting polyamino compounds having three or more active amino groups with monohydroxy monocarboxylic acids, or the corresponding esters, or lactones.

Still other multi-chain polymers may be prepared by reacting polyalcohols with three or more reactive hydroxyl groups, or the corresponding esters of said polyalcohols, with monohydroxy monocarboxylic acids or the corresponding esters, amides and lactones.

The compounds described in the preceding five paragraphs are analogous to those described and claimed in this application and they are prepared by methods analogous to those described herein for the preparation of polyamides.

I claim:

1. A method of preparing a polyamide condensation polymer which comprises heating a compound of the group consisting of amino acids having, as the sole reactive groups, a single primary amino group and a single carboxylic acid group, said groups being separated by more than four atoms, and the corresponding amide-forming esters, amides and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 30 to 30,000 molecules for each molecule of polyamine.

2. A method of preparing a polyamide condensation polymer which comprises heating a compound of the group consisting of amino acids having, as the sole reactive groups, a single primary amino group and a single carboxylic acid group, said groups being separated by more than four atoms, and the corresponding amide-forming esters, amides and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 75 to 20,000 molecules for each molecule of polyamine.

3. The polyamide condensation polymer prepared by heating a compound of the group consisting of amino acids having, as the sole reactive groups, a single primary amino group and a single carboxylic acid group, said groups being separated by more than four atoms, and the corresponding amide-forming esters, amides, and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportions of 30 to 30,000 molecules for each molecule of polyamine.

4. The polyamide condensation polymer prepared by heating a compound of the group consisting of amino acids having, as the sole reactive groups, a single primary amino group and a single carboxylic acid group, said groups being separated by more than four atoms, and the corresponding amide-forming esters, amides and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 75 to 20,000 molecules for each molecule of polyamine.

5. A method of preparing polyamide condensation polymers which comprises heating a compound of the group consisting of amino acids having, as the sole reactive groups, a single primary amino group and a single carboxylic acid group, said groups being separated by more than four atoms, and the corresponding amide-forming esters, amides and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 10 to 1,000 molecules for each amino group of the polyamine molecule.

6. A method of preparing polyamide condensation polymers which comprises heating a compound of the group consisting of amino acids having, as the sole reactive groups, a single primary amino group and a single carboxylic acid group, said groups being separated by more than four atoms, and the corresponding amide-forming esters, amides and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 25 to 200 molecules for each amino group of the polyamine molecule.

7. The polyamide condensation polymers prepared by heating a compound of the group consisting of amino acids having, as the sole reactive groups, a single primary amino group and a single carboxylic acid group, said groups being separated by more than four atoms, and the corresponding amide-forming esters, amides, and lactams of said amino acids, with a compound of the group consisting of polyamines having, as the sole reactive groups, at least three reactive amino groups attached to aliphatic carbon atoms, and the corresponding amide-forming amides of said polyamines, said amino acids being present in the proportion of 10 to 1,000 molecules for each amino group of the polyamine molecule.

8. The polyamide condensation polymers prepared by heating a compound of the group consisting of amino acids having, as the sole reactive groups, a single primary amino group, and a single carboxylic acid group, said groups being separated by more than four atoms, and the corresponding amide-forming esters, amides, and lactams of said amino acids, with a compound of the group consisting of polyamines having, as the sole reactive groups, at least three reactive amino groups attached to aliphatic carbon atoms, and the corresponding amide-forming amides of said polyamine, said amino acids being present in the proportion of 25 to 200 molecules for each amino group of the polyamine molecule.

9. A method of preparing a polyamide condensation polymer which comprises heating epsilon-caprolactam and tetra (aminomethyl) methane, said epsilon-caprolactam being present in the proportion of 30 to 30,000 molecules for each molecule of the polyamine.

10. The polyamide condensation polymer prepared by heating epsilon-caprolactam and tetra (aminomethyl) methane, said epsilon-caprolactam being present in the proportion of 30 to 30,000 molecules for each molecule of the polyamine.

11. A method of preparing a polyamide condensation polymer which comprises heating epsilon-caprolactam and the benzamide of tetra (aminomethyl) methane, said epsilon-caprolactam being present in the proportion of 30 to 30,000 molecules for each molecule of the benzamide.

12. The polyamide condensation polymer prepared by heating epsilon-caprolactam and the benzamide of tetra (aminomethyl) methane, said epsilon-caprolactam being present in the proportion of 30 to 30,000 molecules for each molecule of the benzamide.

PAUL J. FLORY.

REFERENCES CITED

The following references are of record in the file of this patent:

FOREIGN PATENTS

| Number | Country | Date |
|---|---|---|
| 906,892 | France | Feb. 22, 1946 |